US012330537B2

(12) United States Patent
Zhao et al.

(10) Patent No.: US 12,330,537 B2
(45) Date of Patent: Jun. 17, 2025

(54) STABILITY ROLLERS FOR A LONG RAIL ASSEMBLY

(71) Applicants: Magna Seating Inc, Aurora (CA); Kai Zhao, Novi, MI (US); Louis Vetere, II, Commerce Township, MI (US); Avery Folk, Ontario (CA); Kristof M Kurzeja, Ontario (CA)

(72) Inventors: Kai Zhao, Novi, MI (US); Louis Vetere, II, Commerce Township, MI (US); Avery Folk, Ontario (CA); Kristof M Kurzeja, Ontario (CA)

(73) Assignee: Magna Seating Inc., Aurora (CA)

( * ) Notice: Subject to any disclaimer, the term of this patent is extended or adjusted under 35 U.S.C. 154(b) by 65 days.

(21) Appl. No.: 18/445,069

(22) PCT Filed: Sep. 27, 2021

(86) PCT No.: PCT/US2021/052166
§ 371 (c)(1),
(2) Date: Mar. 27, 2023

(87) PCT Pub. No.: WO2022/067167
PCT Pub. Date: Mar. 31, 2022

(65) Prior Publication Data
US 2024/0351486 A1 Oct. 24, 2024

Related U.S. Application Data

(60) Provisional application No. 63/083,137, filed on Sep. 25, 2020.

(51) Int. Cl.
*B60N 2/07* (2006.01)
*B60N 2/06* (2006.01)

(52) U.S. Cl.
CPC ............ *B60N 2/0722* (2013.01); *B60N 2/06* (2013.01); *B60N 2/07* (2013.01)

(58) Field of Classification Search
CPC ..... B60N 2/0722; B60N 2/07; B60N 2205/20
See application file for complete search history.

(56) References Cited

U.S. PATENT DOCUMENTS 2,970,015 A * 1/1961 Ragsdale ................ F16C 29/04
384/47
4,508,385 A * 4/1985 Bowman .............. B60N 2/0868
297/341

(Continued)

FOREIGN PATENT DOCUMENTS

WO 2013161620 4/2013
WO 2020186259 9/2020

*Primary Examiner* — Nkeisha Smith
(74) *Attorney, Agent, or Firm* — Miller Canfield

(57) ABSTRACT

A long rail assembly for repositioning a vehicle seat in a vehicle includes a fixed long rail and a rail drive assembly configured to be repositionable along the fixed long rail. The rail drive assembly includes an upper channel and a flexible stability roller assembly. The flexible stability roller assembly has first and second stability rollers rotationally coupled to respective first and second wing portions of a flexible wing bracket. The flexible wing bracket has a generally W-shaped cross-section in profile with the first and second wing portions extending at a first angle from adjacent first and second side portions, respectively, and the first and second side portions extending at a second angle from a center portion. The center portion of the flexible wing bracket is fixedly coupled to the upper channel.

19 Claims, 8 Drawing Sheets

(56) References Cited

U.S. PATENT DOCUMENTS

| | | | | | |
|---|---|---|---|---|---|
| 4,511,187 | A | * | 4/1985 | Rees | B60N 2/0705 |
| | | | | | 312/332 |
| 4,673,217 | A | * | 6/1987 | Nishiyama | B60N 2/0715 |
| | | | | | 297/473 |
| 5,755,422 | A | * | 5/1998 | Susko | B60N 2/073 |
| | | | | | 248/430 |
| 6,869,057 | B2 | * | 3/2005 | Matsumoto | B60N 2/0818 |
| | | | | | 248/429 |
| 9,994,128 | B2 | | 6/2018 | Cheung et al. | |
| 2021/0370804 | A1 | | 12/2021 | Zhao et al. | |

* cited by examiner

SECTION A-A

SECTION B-B
PRIOR ART

STABILITY ROLLERS FOR A LONG RAIL ASSEMBLY

CROSS-REFERENCE TO RELATED APPLICATIONS

This application claims priority to U.S. Provisional Application 63/083,137, filed on Sep. 25, 2020, the disclosure of which is incorporated by reference in its entirety.

BACKGROUND OF THE INVENTION

1. Field of the Invention

The present invention relates to a rail drive assembly that supports a vehicle seat and is configured to travel along a fixed long rail when the vehicle seat is repositioned to another location along the fixed long rail. More particularly, the invention relates to a long rail drive assembly having a flexible stability roller assembly to absorb both vertical and lateral channel variation.

2. Description of Related Art

Various slide mechanisms having stability rolling elements are known for repositioning a vehicle seat along a long rail in a vehicle. One known seat sliding device is disclosed in W.O. Publication 2020/077209 wherein a vehicle seat is coupled to a rail drive assembly that is slidable within a fixed long rail. The rail drive assembly includes wheels configured to travel along an interior track of the fixed long rail. In addition, stability rolling elements are mounted at an angle to side walls of the rail drive assembly. Front and rear stability rolling elements on each side of the rail drive assembly are operationally coupled by a torsion spring extending in a longitudinal direction.

However, this known seat sliding device lacks spring-loaded stability rollers that are spring-loaded in both lateral and vertical directions to absorb channel variations. In addition, the stability rolling elements of this known seat sliding device includes a plurality of components which can be difficult to assemble. Finally, this exemplary known seat sliding device lacks spring-loaded stability rolling elements that act as a compression spring to resist lateral load applied to the vehicle seat.

It is desirable, therefore, for a rail drive assembly to have a stability roller assembly that is easy to assemble. Further, it is desirable to reduce the number of components in the stability roller assembly. In addition, it is desirable for the stability roller assembly to resist fore-aft load applied to the vehicle seat. It is also desirable that the stability roller assembly can act like a compression spring to resist lateral load applied to the vehicle seat. Finally, it is desirable for the rail drive assembly to have a stability roller assembly that absorbs both vertical and lateral channel and positional variation.

SUMMARY OF THE INVENTION

The present invention relates to a long rail assembly for repositioning a vehicle seat in a vehicle. The long rail assembly includes a fixed long rail and a rail drive assembly configured to be repositionable along the fixed long rail. The rail drive assembly includes an upper channel and a flexible stability roller assembly. The flexible stability roller assembly has first and second stability rollers rotationally coupled to respective first and second wing portions of a flexible wing bracket. The flexible wing bracket has a generally W-shaped cross-section in profile with the first and second wing portions extending at a first angle from adjacent first and second side portions, respectively, and the first and second side portions extending at a second angle from a center portion. The center portion of the flexible wing bracket is fixedly coupled to the upper channel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-6 illustrate a long rail assembly 10 having a rail drive assembly 12 configured to transpose the rail drive assembly 12 along a fixed long rail 14 for vehicle seat adjustment according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
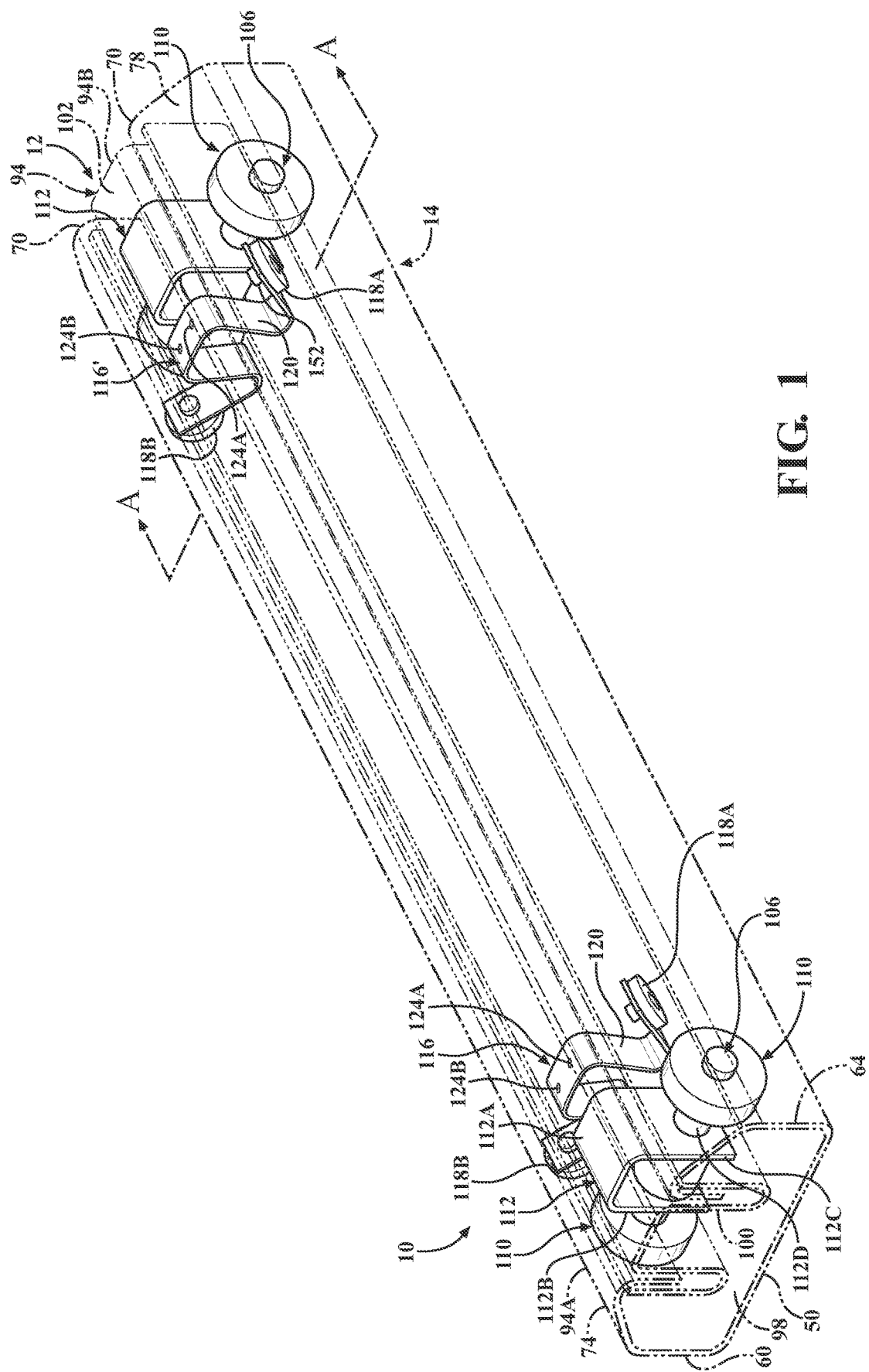
FIG. 1 is a cutaway perspective view of a portion of a long rail assembly including a rail drive assembly having stability rollers connected by a flexible wing bracket, according to one embodiment of the present invention.
Figure 2:
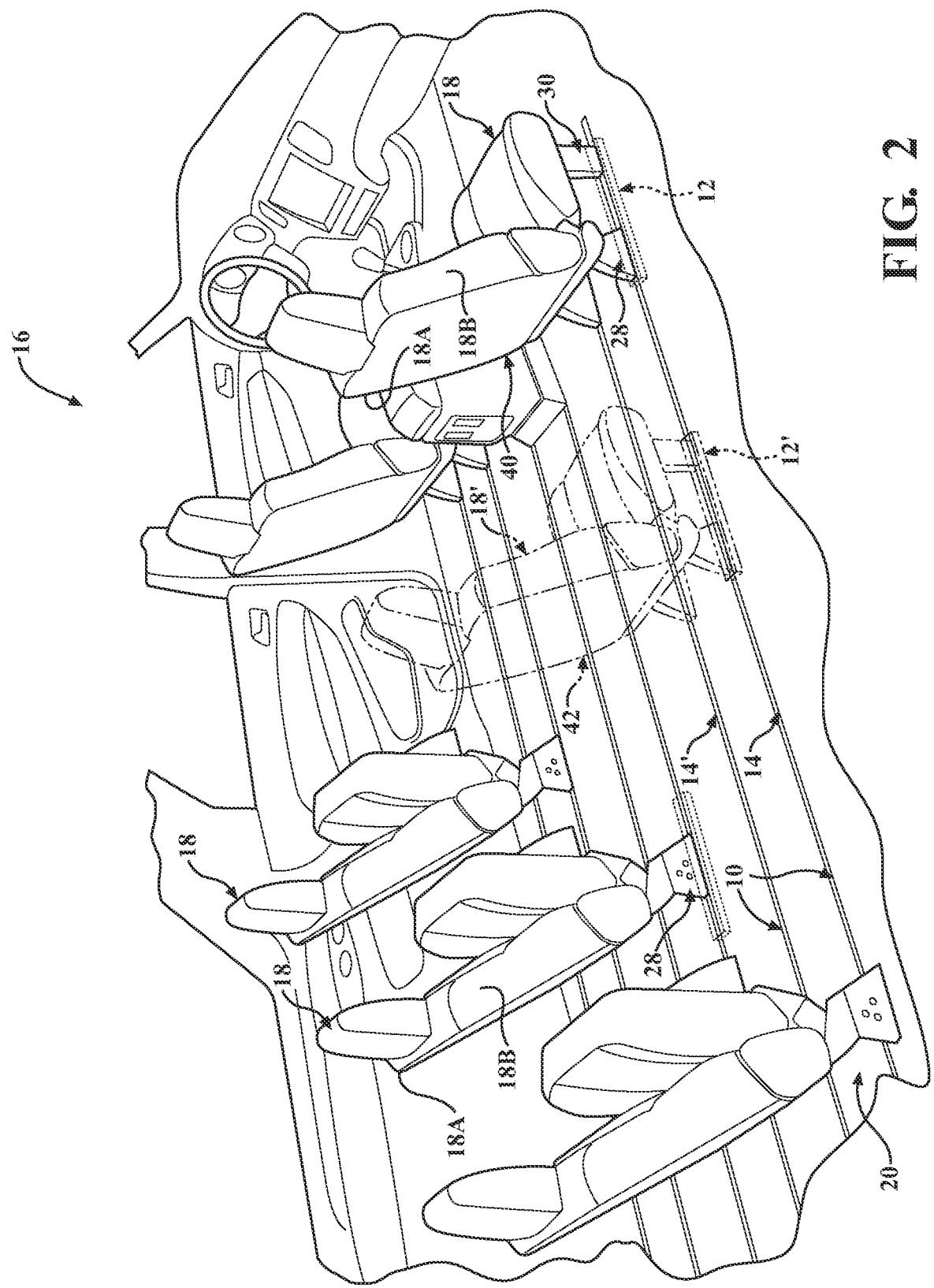
FIG. 2 is a perspective view of a vehicle interior and having vehicle seats coupled to the long rail assembly of FIG. 1, according to one embodiment of the present invention.

FIG. 1 illustrates a long rail assembly 10 having a rail drive assembly 12 for adjusting a position of a vehicle seat 18 along a fixed long rail 14 according to one embodiment of the present invention. FIG. 2 shows a vehicle interior 16 having a plurality of vehicle seats 18 connected to rail drive assemblies 12 attached to a vehicle floor 20. A cross-sectional view of the long rail assembly 10 of FIG. 1 taken along section line A-A is shown in FIG. 3.

Referring to FIG. 2, each vehicle seat 18 is supported by at least one leg 28 on opposing sides 18A, 18B of the vehicle seat 18, and optionally front and rear legs 30, 28 on the opposing sides 18A, 18B of the vehicle seat 18. Each rail drive assembly 12 travels along one of the fixed long rails 14 attached to the vehicle floor 20. Each vehicle seat 18 travels along a pair of fixed long rails 14, 14' when the vehicle seat 18 is repositioned between a first seat location 40 and a second seat location 42, shown as vehicle seat 18' attached to rail drive assembly 12'. The fixed long rails 14 can extend for any length suitable for an intended application. Likewise, any suitable number of fixed long rails 14 can be positioned on the vehicle floor 20 as desired for an intended application. Thus, the long rail assembly 10 allows for improved vehicle seat 18 position adjustment since the vehicle seat 18 coupled to at least one rail drive assembly 12 is repositionable to any seat position 40, 42 along the at least one fixed long rail 14. In certain embodiments, the rail drive assembly 12 is a manual rail drive assembly that is manually repositioned along the fixed long rail 14. In other embodiments, the rail drive assembly 12 is a power rail drive assembly configured to be automatically repositioned along the fixed long rail 14.

Returning to FIGS. 1 and 3, the fixed long rail 14 has a generally U-shaped cross-section 46 in profile extending in a longitudinal direction, a bottom wall 50, opposing first and second side walls 60, 64, an interior cavity 68, and a top wall 70 having an elongated opening 72 extending in a longitudinal direction. Extending between each one of the first and second side walls 60, 64 and terminating at the adjacent top wall 70 is an upper side wall 74, 78. The first and second upper side walls 74, 78 extend at an angle from the adjacent side wall 60, 64. The fixed long rail 14 is a stamped, formed, molded, and/or rolled section of metal, plastic, or combinations of metal and plastic materials and has a length selected based on a specific application. It should be appreciated that the size and shape of the fixed long rail 14 may vary without altering the scope of the invention. The dimensions of the fixed long rail 14, including the cross-sectional profile 46, are selected, in part, based on generally known engineering calculations, finite element analysis (FEA), and physical testing.

Figure 3:
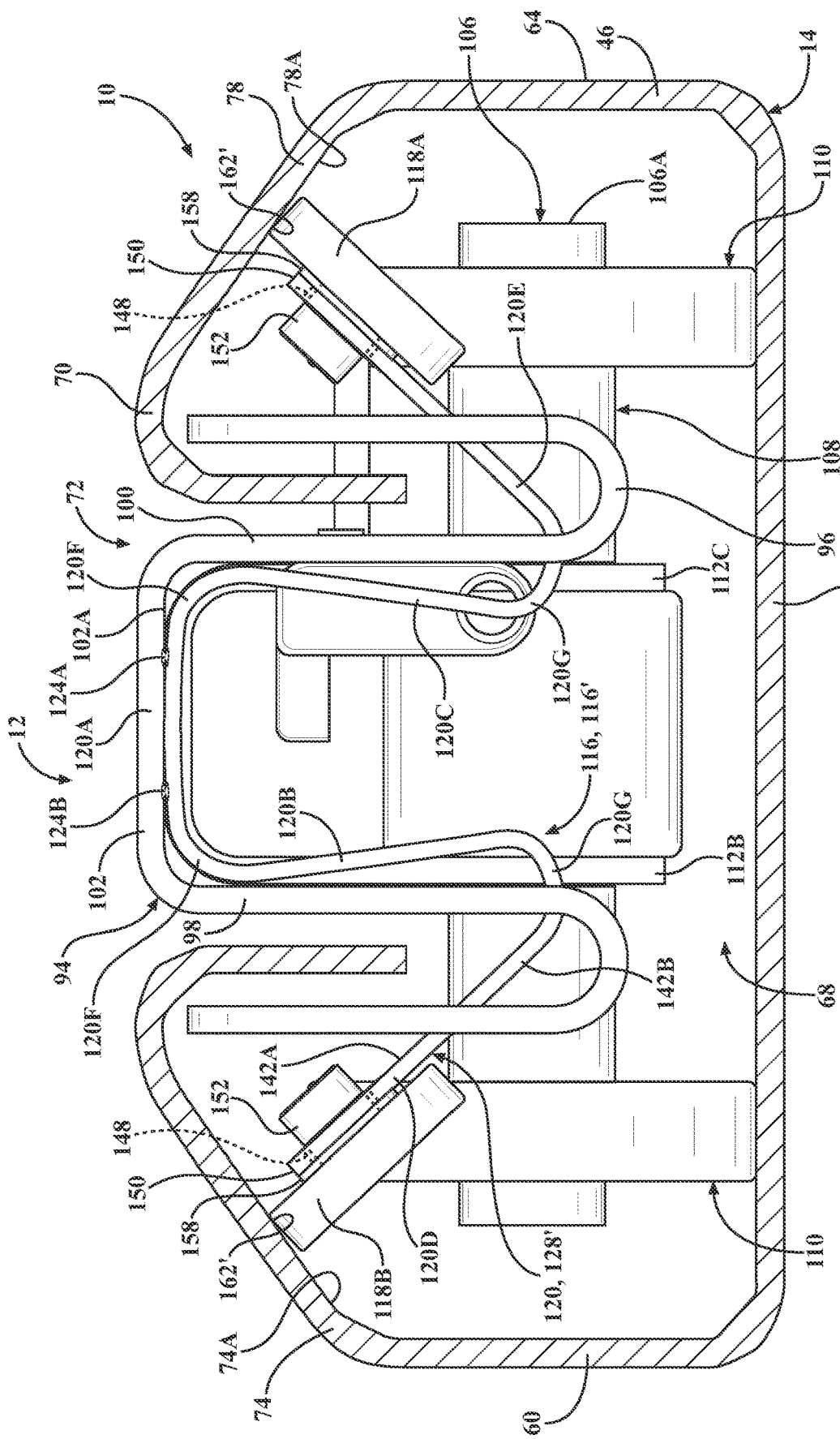
FIG. 3 is a cross-sectional view of the long rail assembly of FIG. 1 taken along section line A-A shown in FIG. 1, according to one embodiment of the present invention.

Also shown in FIGS. 1 and 3, the rail drive assembly 12 includes an elongated upper channel 94 having a generally W-shape cross-section 96 in profile, opposing first and second side walls 98, 100 and a top wall 102 extending between the opposing first and second side walls 98, 100. An axle 106 extends laterally through a hollow tube 108 extending between the opposing side walls 98, 100. A wheel 110 is fixedly coupled to each end 106A of the axle 106. The rail drive assembly 12 shown in the embodiment of FIG. 1 includes a pair of wheels 110 positioned adjacent to opposing ends 94A, 94B of the upper channel 94. While not shown, the wheels 110 can be replaced by rollers and/or glides. Any number and/or combination of wheels 110, rollers, and/or glides may be used as suitable for an intended application. Further, each wheel 110 or roller can be rotationally attached to the upper channel 94 using a shaft (not shown) fixedly coupled to one of the side walls 98, 100 of the upper channel 94.

In the embodiment shown in FIG. 1, each pair of wheels 110 is attached to carrier 112 having a generally inverted U-shape cross-section in profile. The carrier 112 includes an upper wall 112A extending between opposing first and second side walls 112B, 112C. The axle 106 passes through a hole 112D in each of the opposing first and second side walls 112B, 112C. The carrier 112 is fixedly coupled to the upper channel 94.

As shown in FIG. 1, the rail drive assembly 12 includes spaced apart first and second flexible stability roller assemblies 116, 116'. Each of the first and second flexible stability roller assemblies 116, 116' is positioned near a respective end 94A, 94B of the upper channel 94.

Referring to FIG. 3, the flexible stability roller assemblies 116, 116' are fixedly coupled to a lower side 102A of the top wall 102 of the upper channel 94. Each flexible stability roller assembly 116, 116' includes first and second stability rollers 118A, 118B rotationally coupled to a flexible wing bracket 120. In the embodiment shown in FIG. 3, a center portion 120A of the flexible wing bracket 120 is welded to the upper channel 94 in two spaced apart locations 124A, 124B. In certain embodiments, the flexible wing bracket 120 is welded to the upper channel 94 in one location 124A, 124B. It will be understood that the flexible wing bracket 120 can be fixedly coupled to the upper channel 94 through other known methods including but not limited to a mechanical fastener, crimping, welding, and press fit.

Figure 4:
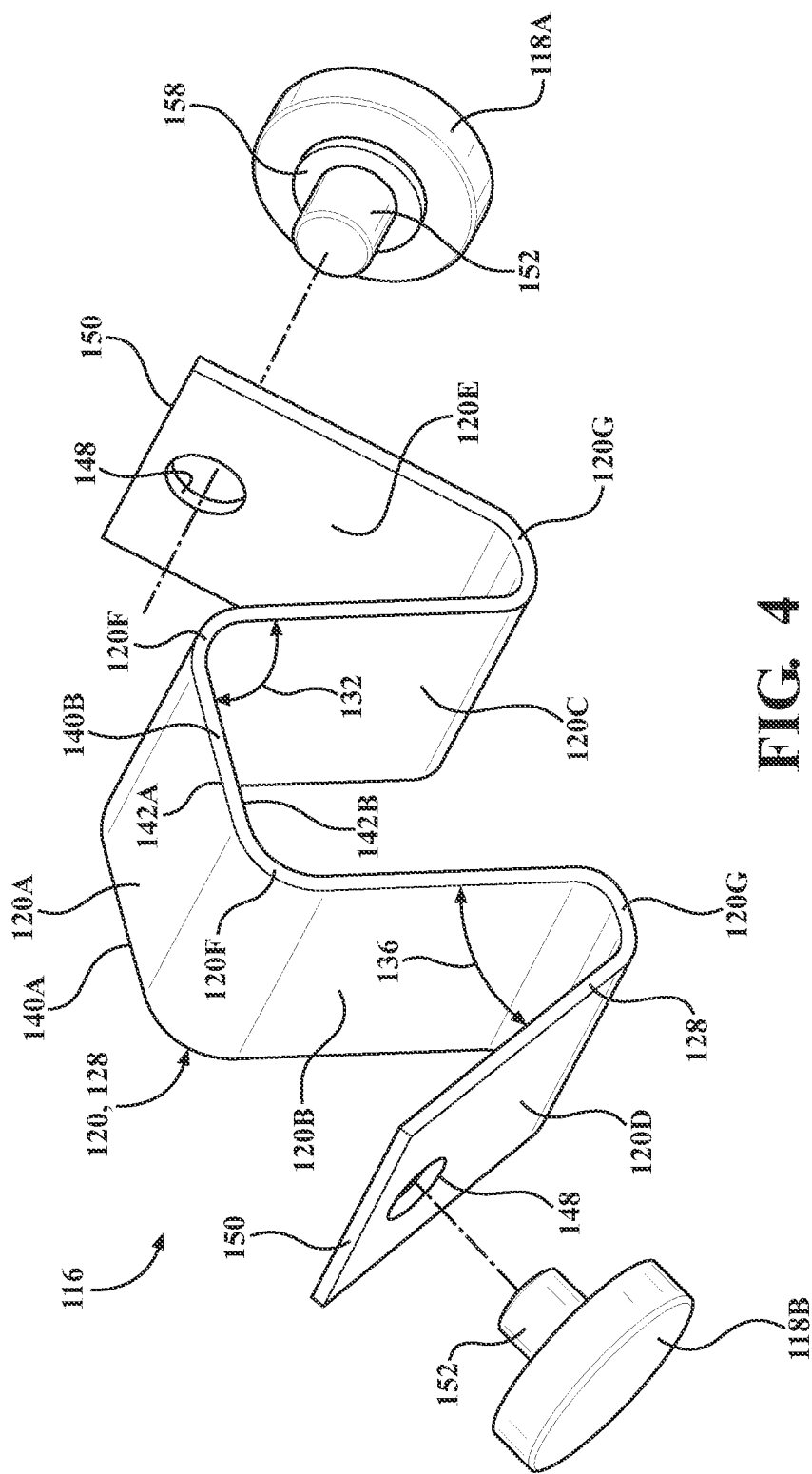
FIG. 4 is an exploded view of the stability rollers connected by the wing bracket of FIG. 3.

The flexible wing bracket 120 is shown removed from the rail drive assembly 12 in FIG. 4. The flexible wing bracket 120 is a flexible bracket formed out of a metal material such as high strength low alloy (HSLA) steel. One exemplary suitable HSLA steel is Society of Automotive Engineers (SAE) grade 980. It will be understood that other grades and types of steel can be used in alternate embodiments without altering the scope of the invention. Referring to FIG. 4, the flexible wing bracket 120 has a general W-shape with opposing first and second side portions 120B, 120C extending from the center portion 120A. Each of opposing first and second wing portions 120D, 120E extend from the adjacent first and second side portions 120B, 120C. In the embodiment shown in FIG. 4, each of the first and second side portions 120B, 120C are connected to the center portion 120A by a first curved portion 120F. The first and second wing portions 120D, 120C are connected to the adjacent side portions 120B, 120C by a second curved portion 120G. The flexible wing bracket 120 has an unconstrained profile 128 (i.e., a "free" profile) in FIG. 4. The first and second side portions 120B, 120C project from the center portion 120A an angle 132 of about ninety degrees. However, the specific size, shape, and orientation of the center portion 120A and the first and second side portions 120B, 120C are selected to fit within the upper channel 94. As such, the size, shape, and orientation of the center portion 120A and the first and second side portions 120B, 120C will vary to fit alternate embodiments of the upper channel 94.

Also shown in FIG. 4, the first and second wing portions 120D, 120E project away from the adjacent first and second side portions 120B, 120C at an angle 136 of about forty degrees. It will be understood that the angle 136 between the first and second wing portions 120D, 120E and the adjacent first and second side portions 120B, 120C can vary in alternate embodiments. For example, in certain embodiments the unconstrained angle 136 between the first and second wing portions 120D, 120E and the adjacent first and second side portions 120B, 120C, is selected to be between thirty degrees and fifty degrees, as a non-limiting example. It will be understood that the unconstrained angle 136 is selected based in part on the specific profile and dimensions of the fixed long rail 14. In the embodiment shown in FIG. 4, the flexible wing bracket 120 has a longitudinal length between opposing first and second end surfaces 140A, 140B of about 23 mm. In addition, the exemplary flexible wing bracket 120 has a thickness of about 1 mm as measured between opposing first and second surfaces 142A, 142B of the center portion 120A. It will be understood that the longitudinal length of the flexible wing bracket 120 between the first and second end surfaces 140A, 140B can vary without altering the scope of the invention. Likewise, the thickness of the flexible wing bracket 120 between opposing first and second surfaces 142A, 142B can vary without altering the scope of the invention. The flexible wing bracket 120 is alternatively formed out of sheet stock that has been stamped, molded, formed, and/or bent, as non-limiting examples, into the desired shape.

Each of the first and second wing portions 120D, 120E includes an aperture 148 positioned near a distal end 150 of the first and second wing portions 120D, 120E and extending between the opposing first and second surfaces 142A, 142B, as shown in FIG. 4. The aperture 148 is sized and shaped to matingly engage with a shaft 152 extending from the stability roller 118A, 118B. The stability rollers 118A, 118B are optionally rotationally coupled to the associated shaft 152 with the associated shaft 152 being fixedly coupled to the flexible wing bracket 120. Alternatively, the shaft 152 is rotationally coupled to the flexible wing bracket 120 with the stability roller 118A, 118B being fixedly coupled to the shaft 152. In addition, a washer 158 is assembled between the flexible wing bracket 120 and the stability roller 118A, 118B. In certain embodiments, the washer 158 is fixedly coupled to the shaft 152, fixedly coupled to the stability roller 118A, 118B, or is a separate component assembled onto the shaft 152.

Figure 5:
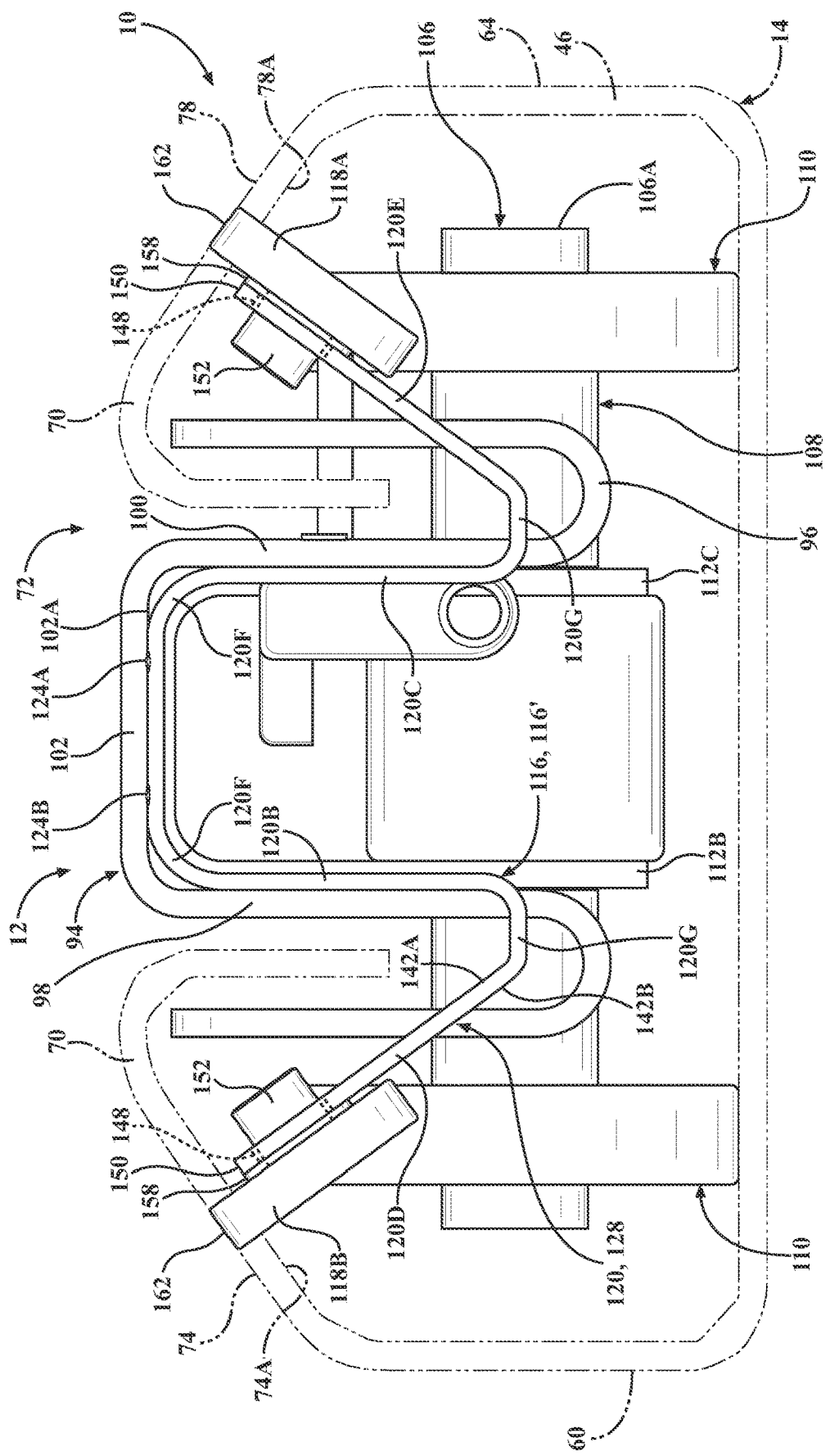
FIG. 5 is a cutaway end view of the long rail assembly of FIG. 3 showing the stability rollers and the wing bracket in an unconstrained condition.

The flexible stability roller assembly 116, 116' is shown assembled with the upper channel 94 in FIG. 5. The stability rollers 118A, 118B are shown assembled with the flexible wing bracket 120. The flexible wing bracket 120 is sized and shaped such that distal ends 162 of the stability rollers 118A, 118B have a designed interference with the fixed long rail 14. More specifically, the distal ends 162 of the stability rollers 118A, 118B extend beyond at least the inner surface 74A, 78A of the upper side walls 74, 78 when the flexible wing bracket 120 is unconstrained.

Figure 6:
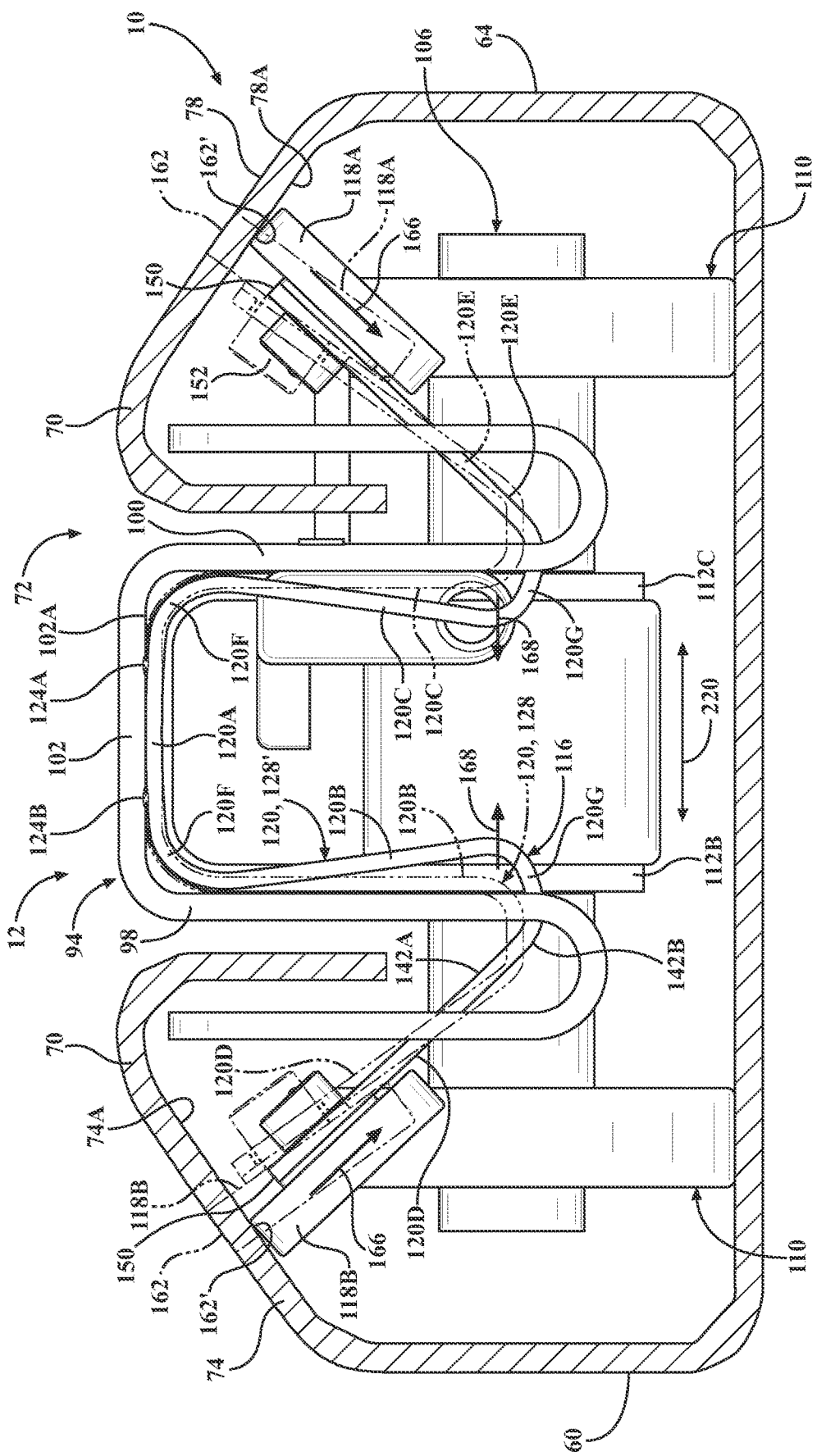
FIG. 6 is a cutaway end view of the long rail assembly of FIG. 7, showing the stability rollers and wing bracket in a constrained condition.

FIG. 6 shows the flexible stability roller assembly 116, 116' assembled with the fixed long rail 14. A comparison of the unconstrained profile 128 and the constrained profile 128' of the flexible wing bracket 120 is shown in FIG. 6. Since the unconstrained profile 128 of the flexible wing bracket 120 has a designed interference with the fixed long rail 14, each of the distal ends 162 of the stability rollers 118A, 118B are pressed inward and downward, as represented by arrow 166, during assembly with the fixed long rail 14. In addition, each of the first and second side portions 120B, 120C of the flexible wing bracket 120 are deflected inward, as illustrated by arrow 168. The flexing of the flexible wing bracket 120 moves the distal end 162 of the unconstrained profile 128 to abut the inner surface 74A, 78A of the upper side walls 74, 78, as illustrated by distal end 162' of the constrained profile 128'. Since the flexible wing bracket 120 is flexible and essentially acts as a spring, the flexible wing bracket 120 can accommodate for variation in the dimensions of the fixed long rail 14 as well as accommodating for variation within the rail drive assembly 12. The elastic deformation of the flexible wing bracket 120 absorbs channel variation in both up-down and cross-car directions. The elastic deformation during assembly can provide reaction force to the stability rollers 118A, 118B. Since the stability rollers 118A, 118B contact the fixed long rail 14 at an angle, the reaction force from the flexible wing bracket 120 can provide resistance to both up-down and cross-car variation from the rail drive assembly 12. In addition, the elastic deformation of the flexible wing bracket 120 during assembly with the fixed long rail 14 acts as a compression spring to resist lateral load applied to the vehicle seat 18. Further, the flexible wing bracket 120 assists with centering the rail drive assembly 12 within the fixed long rail 14 since the flexible wing bracket 120 maintains a spring bias holding the stability rollers 118A, 118B against the upper side walls 74, 78 of the fixed long rail 14.

Figure 7:
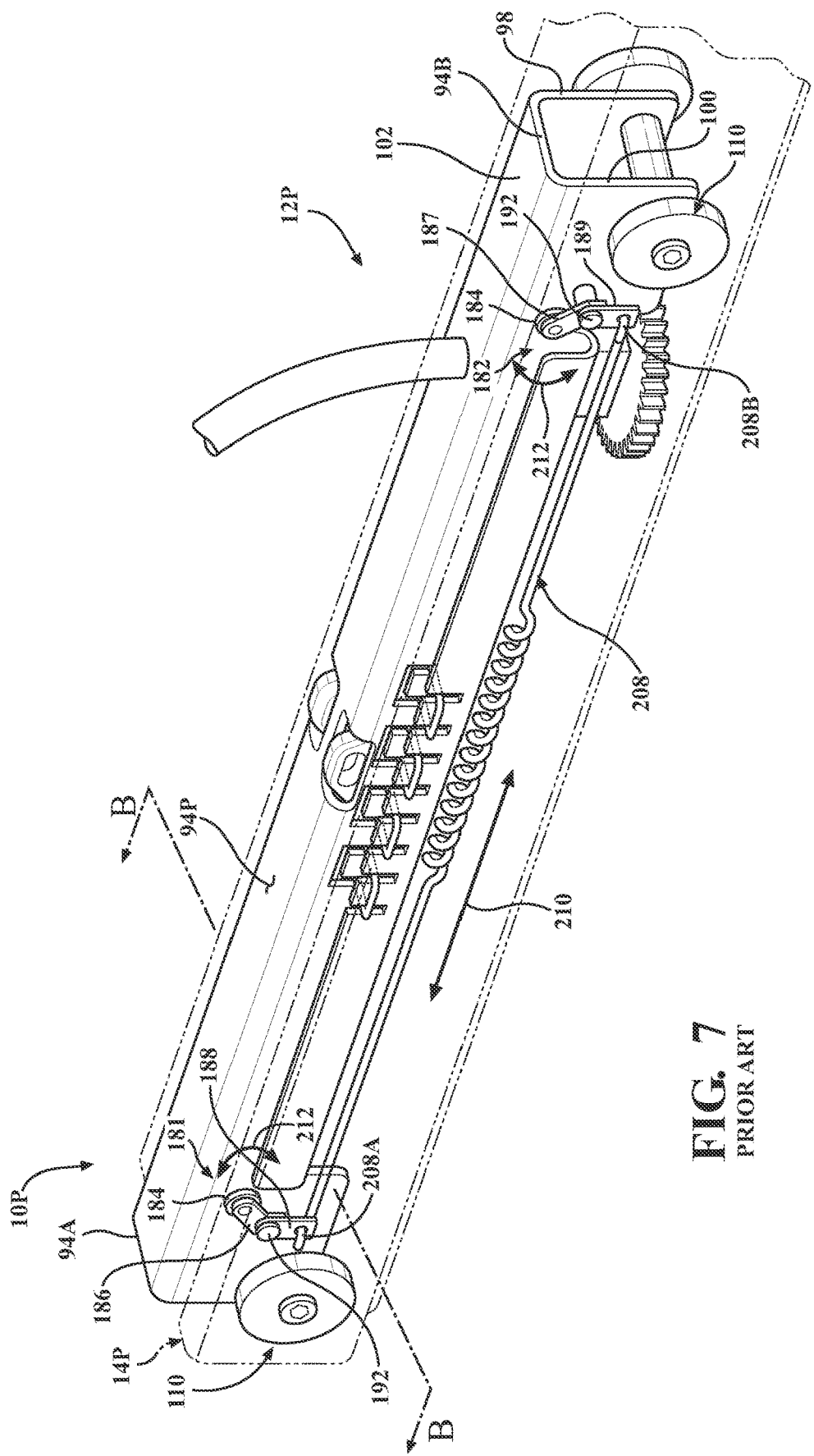
FIG. 7 is a cutaway perspective view of a portion of a known long rail assembly having stability rolling elements mounted at an angle to side walls of a rail drive assembly, illustrating stability rolling elements mounted on each side wall of the rail drive assembly being connected by a torsion spring.
Figure 8:
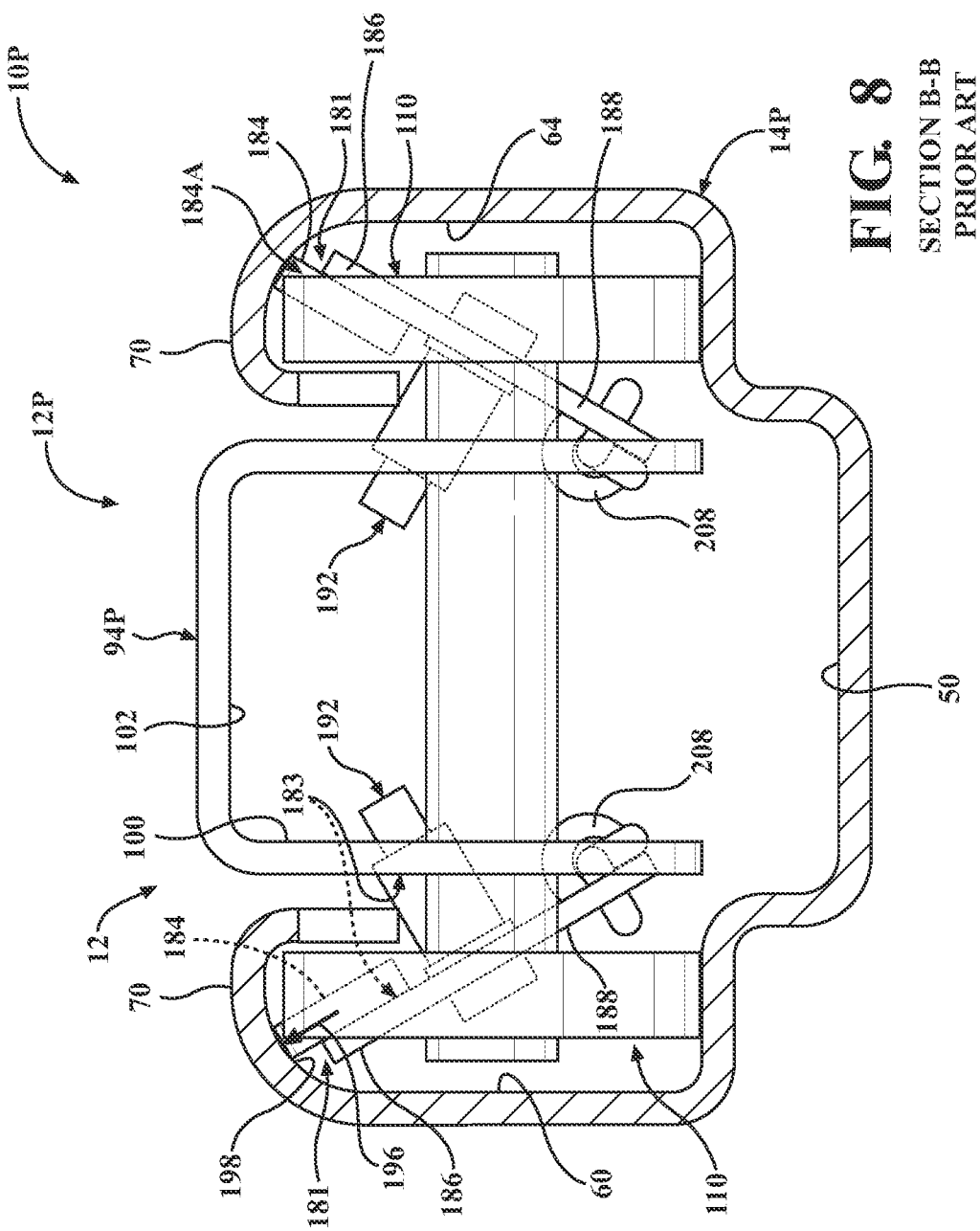
FIG. 8 is a cutaway end view of the known long rail assembly of FIG. 7 taken along section line B-B shown in FIG. 7, illustrating the stability rolling elements being mounted at an angle to the adjacent side wall of the rail drive assembly.

In contrast, an exemplary known long rail assembly 10P having spring-loaded stability roller elements 181, 182 is shown in FIGS. 7 and 8. Elements that are the same or similar to those used above in the embodiment shown in FIGS. 1-6 have the same reference numbers for simplicity. Referring to FIG. 7, the known long rail assembly 10P includes a known rail drive assembly 12P configured to travel along a fixed long rail 14P. The known rail drive assembly 12P includes an upper channel 94 having opposing side walls 98, 100 extending from a top wall 102 forming an inverted U-shape and extending between opposing ends 94A, 94B of the upper channel 94. Wheels 110 are rotationally coupled to the upper channel 94 near each end 94A, 94B of the upper channel 94. As shown in FIG. 8, the fixed long rail 14P is generally U-shaped with opposing side walls 60, 64 extending between a bottom wall 50 and a top wall 70 of the fixed long rail 14P. Extending between each side wall 60, 64 and the adjacent top wall 70 is a curved portion 198 having a large corner radius 196.

Referring to FIG. 7, the known stability rolling elements 181, 182 are rotationally coupled to each side wall 98, 100 of the upper channel 94P. FIG. 8 is a cross-sectional end view taken along section B-B of FIG. 7 showing the stability rolling elements 181, 182 being mounted at an angle 183 of about thirty degrees to the side walls 98, 100 of the upper channel 94P. Each stability rolling element 181, 182 includes a roller 184, an upper arm 186, 187, a lower arm 188, 189, and a support stud 192. Each roller 184 is rotationally coupled to the associated upper arm 186, 187. Each upper arm 186, 187 is rotationally coupled to the associated support stud 192. Each support stud 192 is fixedly coupled to the adjacent side wall 98, 100 at a mounting angle 183, such as about 30 degrees as shown in FIG. 8. In addition, the upper arm 187 is fixedly coupled to the lower arm 189 so they are linked together to move as one arm.

Referring to FIG. 7, a first end 208A of a torsion spring 208 is connected to the lower arm 188 of the known first stability rolling element 181. A second end 208B of the torsion spring 208 is connected to the lower arm 189 of the known second stability rolling element 182. The torsion spring 208 biases the rollers 184 of the stability rolling elements 181, 182 towards the adjacent fixed long rail 14P curved portions 198. In addition, the torsion spring 208 induces a longitudinal spring bias into the stability rolling elements 181, 182, as illustrated by arrow 210 shown in FIG. 7. Further, the known stability rolling elements 181, 182 can rotate with respect to the associated pivot shaft 192, as illustrated by arrows 212. The roller 184 absorbs variations in both a lateral and a vertical directions of the fixed long rail 14 since the roller 184 is angled at about 30 degrees from the side walls 100, 98 of the upper channel 94.

However, the stability rolling elements 181, 182 of the known long rail assembly 12P shown in FIGS. 7 and 8 require a plurality of parts, including the upper arm 186, 187, the lower arm 188, 189, the support stud 192, and the torsion spring 208. In the embodiment shown in FIGS. 1-6, these components have been replaced by a single flexible wing bracket 120. The reduction in the number of components directly reduces the cost and complexity of the long rail assembly 12 in comparison to the known long rail assembly 12P.

In addition, assembly of the flexible wing bracket 120 with the fixed long rail 14 induces a lateral spring bias load into the flexible wing bracket 120, as illustrated by arrow 220 shown in FIG. 6. The torsion spring 208 of the known long rail assembly 12P induces a longitudinal spring bias 210 into the stability rolling elements 181, 182. The known long rail assembly 12P relies on the upper arms 186, 187 being oriented at about a thirty degree angle with respect to the adjacent side wall 98, 100 of the upper channel 94 in combination with the curved portion 198 of the side walls 60, 64 of the fixed long rail 14P to laterally bias the stability rolling elements 181, 182 towards the side walls 60, 64 of the fixed long rail 14P. The flexible wing bracket 120 of the embodiment shown in FIGS. 1-6 actively spring biases the stability rollers 118A, 118B towards the adjacent upper side wall 74, 78 of the fixed long rail 14. As such, the flexible wing bracket 120 actively laterally stabilizes the upper channel 94 within the fixed long rail 14.

One benefit of a rail drive assembly 12 for a long rail assembly 10 having a flexible stability roller assembly 116, 116' is the flexible stability roller assembly 116, 116' is easy to assemble since there are few components. A second benefit of the flexible stability roller assembly 116, 116' is the cost is reduced in comparison to other known spring-loaded stability rollers since the number of components has been reduced. A third benefit is the flexible stability roller assembly 116, 116' can act like a compression spring to resist lateral load applied to the vehicle seat 18. A fourth benefit is the flexible stability roller assembly 116, 116' can absorb both vertical and lateral channel and positional variation.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A long rail assembly for transposing a vehicle seat along a fixed long rail, the long rail assembly comprising:
   said fixed long rail having a generally U-shaped cross-section in profile, including a bottom wall, opposing first and second side walls extending at an angle from said bottom wall, opposing first and second upper side walls extending at an angle from said first and second side walls, respectively, and terminating at a top wall, an interior cavity defined between said opposing first and second side walls, said first and second upper side walls, said bottom wall, and said top wall, and said fixed long rail having an elongated opening extending longitudinally in said top wall; and
   a rail drive assembly configured to be repositionable along said fixed long rail, said rail drive assembly comprising:
      an elongated upper channel having a generally inverted U-shaped cross-section in profile, said upper channel having opposing first and second side walls and a third wall extending between said first and second side walls; and
      a flexible stability roller assembly comprising a flexible wing bracket and first and second stability rollers rotationally coupled to respective first and second wing portions of said flexible wing bracket, said flexible wing bracket having a generally W-shaped cross-section in profile with said first and second wing portions extending at a first angle from adjacent first and second side portions, respectively, and said first and second side portions extending at a second angle different from said first angle from a center portion, and wherein said center portion of said flexible wing bracket is fixedly coupled to said third wall of said upper channel.

2. The long rail assembly as set forth in claim 1, wherein said center portion and at least a portion said opposing first and second side portions of said flexible wing bracket are configured to fit between said first and second side walls of said upper channel.

3. The long rail assembly as set forth in claim 2, wherein:
   said flexible wing bracket has a first profile when said flexible wing bracket is unconstrained and spaced apart from said fixed long rail; and
   said flexible wing bracket has a second profile different than said first profile when said rail drive assembly is assembled with said fixed long rail.

4. The long rail assembly as set forth in claim 3, wherein: said first profile of said flexible wing bracket has a designed interference with said fixed long rail.

5. The long rail assembly as set forth in claim 4, wherein assembling said rail drive assembly with said fixed long rail elastically deforms said flexible wing bracket and induces a spring bias into said flexible wing bracket biasing said first and second stability rollers towards said respective first and second upper side walls.

6. The long rail assembly as set forth in claim 5, wherein:
   each of said first and second wing portions include an aperture;
   each of said first and second stability rollers are rotationally coupled to one of first and second shafts; and
   at least a portion of each of said first and second shafts pass through said aperture in a respective one of said first and second wing portions.

7. The long rail assembly as set forth in claim 6, wherein:
   said first angle of said first profile of said flexible wing bracket is between about thirty degrees and about fifty degrees.

8. The long rail assembly as set forth in claim 7, wherein said first angle of said first profile of said flexible wing bracket is about 40 degrees.

9. The long rail assembly as set forth in claim 7, wherein:
   said flexible stability roller assembly comprises a first flexible stability roller assembly and a second flexible stability roller assembly; and
   said first and second flexible stability roller assemblies being spaced apart and fixedly coupled to said third wall of said upper channel.

10. The long rail assembly as set forth in claim 5, wherein said flexible wing bracket being formed of high strength low alloy steel.

11. The long rail assembly as set forth in claim 10, wherein said flexible wing bracket being fixedly coupled to said upper channel by a weld.

12. The long rail assembly as set forth in claim 11, wherein said flexible wing bracket being fixedly coupled to said upper channel by spaced apart first and second welds.

13. The long rail assembly as set forth in claim 10, wherein said flexible wing bracket being fixedly coupled to said upper channel by a mechanical fastener.

14. A rail drive assembly for transposing a vehicle seat along a fixed long rail, said rail drive assembly comprising:
   an elongated upper channel having a generally inverted U-shaped cross-section in profile, said upper channel having opposing first and second side walls and a third wall extending between said first and second side walls; and a flexible stability roller assembly comprising a flexible wing bracket and first and second stability rollers rotationally coupled to respective first and second wing portions of said flexible wing bracket, said flexible wing bracket having a generally W-shaped cross-section in profile with said opposing first and second wing portions extending at a first angle from adjacent first and second side portions, respectively, and said first and second side portions extending at a second angle different from said first angle from a center portion, and wherein said center portion of said flexible wing bracket is fixedly coupled to said third wall of said upper channel.

15. The rail drive assembly as set forth in claim 14, wherein:
said flexible wing bracket has a first profile when said flexible wing bracket is unconstrained and spaced apart from said fixed long rail; and
said flexible wing bracket has a second profile different than said first profile when said rail drive assembly is assembled with said fixed long rail.

16. The rail drive assembly as set forth in claim 15, wherein assembling said rail drive assembly with said fixed long rail elastically deforms said flexible wing bracket and biases said first and second stability rollers towards a respective one of said first and second side portions of said fixed long rail.

17. The rail drive assembly as set forth in claim 16, wherein said first angle of said first profile of said flexible wing bracket is between about thirty degrees and about fifty degrees.

18. The rail drive assembly as set forth in claim 17, wherein said first angle of said first profile of said flexible wing bracket is about 40 degrees.

19. The rail drive assembly as set forth in claim 18, wherein said flexible wing bracket being formed of high strength low alloy steel.

\* \* \* \* \*